United States Patent [19]
McGuinness

[11] Patent Number: 6,104,416
[45] Date of Patent: *Aug. 15, 2000

[54] TILING IN PICTURE MEMORY MAPPING TO MINIMIZE MEMORY BANDWIDTH IN COMPRESSION AND DECOMPRESSION OF DATA SEQUENCES

[75] Inventor: Peter J. McGuinness, San Jose, Calif.

[73] Assignee: STMicroelectronics, Inc., Carrollton, Tex.

[ * ] Notice: This patent is subject to a terminal disclaimer.

[21] Appl. No.: 08/972,641

[22] Filed: Nov. 18, 1997

[51] Int. Cl.$^7$ ...................................................... G06F 15/76
[52] U.S. Cl. .......................... 345/516; 345/203; 348/717
[58] Field of Search ..................................... 345/501, 520, 345/521, 507, 516, 517, 203; 348/714–718

[56] References Cited

U.S. PATENT DOCUMENTS

| | | | |
|---|---|---|---|
| 5,579,052 | 11/1996 | Artieri ....................................... | 348/416 |
| 5,581,310 | 12/1996 | Vinekar et al. .......................... | 348/718 |
| 5,675,387 | 10/1997 | Hoogenboom et al. ................ | 348/416 |
| 5,754,234 | 5/1998 | Kitsuki et al. ........................... | 348/394 |
| 5,850,483 | 12/1998 | Takabatake et al. ..................... | 382/233 |
| 5,874,995 | 2/1999 | Naimpally et al. ...................... | 348/384 |
| 5,880,786 | 3/1999 | Oku et al. ................................. | 348/415 |
| 5,920,352 | 7/1999 | Inoye ....................................... | 348/384 |
| 5,936,670 | 8/1999 | Frencken ................................. | 348/413 |

*Primary Examiner*—Ulka J. Chauhan
*Attorney, Agent, or Firm*—David V. Carlson; Theodore E. Galanthay; Lisa K. Jorgenson

[57] ABSTRACT

A method of storing a picture in a memory such that the latency of the memory can be reduced when retrieving a picture from the memory to be displayed while still reducing the bandwidth when retrieving an array portion of the picture from the memory, and a memory architecture. The memory is subdivided into a plurality of words for storing a picture having rows and columns. The picture is partitioned into one or more tiles each having a predetermined number of rows and columns. The number of bytes in one row of one tile is equal to the number of bytes in one word, for storing the data in one row of a tile in one word. The chrominance Cr and Cb components can be stored in one word, with the first 8 bytes of the word containing one and the next eight containing the other.

88 Claims, 8 Drawing Sheets

TILING IN PICTURE MEMORY MAPPING TO MINIMIZE MEMORY BANDWIDTH IN COMPRESSION AND DECOMPRESSION OF DATA SEQUENCES

CROSS-REFERENCE TO RELATED APPLICATIONS

This application contains some text and drawings in common with pending U.S. Patent Applications entitled: "Picture Memory Mapping To Minimize Memory Bandwidth In Compression And Decompression Of Data Sequences" by Jeyendran Balakrishnan and Jefferson E. Owen, application Ser. No. 08/972,917, now U.S. Pat. No. 6,028,612, and has the same effective filing date and ownership as the present application, and to that extent is related to the present application, which is incorporated herein by reference.

BACKGROUND

The present invention relates to the field of electronic devices having a memory array, and is more specifically directed to methods and circuits for storing and retrieving a large amount of data that needs to be accessed sequentially.

The size of a digital representation of uncompressed video images depends on the resolution and color depth of the image. A movie composed of a sequence of uncompressed video images, and accompanying audio signals, quickly becomes too large to fit entirely onto conventional recording medium, such as a compact disk (CD). Moreover, transmitting such an uncompressed movie over a communication link is prohibitively expensive because of the large quantity of data to be transmitted and the bandwidth required to do so.

It is therefore advantageous to compress video and audio sequences before they are transmitted or stored. A great deal of effort is being expended to develop systems to compress these sequences. There are several coding standards currently used that are based on the DCT algorithm, including MPEG-1, MPEG-2, H.261, and H.263. (MPEG is an acronym for "Motion Picture Expert Group", a committee of the International Organization for Standardization, ISO.) The MPEG-1, MPEG-2, H.261 and H.263 standards include decompression protocols that describe how an encoded (i.e. compressed) bitstream is to be decoded (i.e. decompressed). The encoding can be done in any manner, as long as the resulting bitstream complies with the standard.

Video and/or audio compression devices (hereinafter encoders) are used to encode the video and/or audio sequence before the sequence is transmitted or stored. The resulting encoded bitstream is decoded by a video and/or audio decompression device (hereinafter decoder) before the video and/or audio sequence is output. A bitstream can only be decoded by a decoder if the bitstream complies with the standard used by the decoder. To be able to decode the bitstream on a large number of systems, it is advantageous to encode the video and/or audio sequences according to a well accepted encoding/decoding standard. The MPEG standards are currently well accepted standards for one way communication. H.261, and H.263 are currently well accepted standards for two way communication, such as video telephony.

Once decoded, the decoded video and audio sequences can be played on an electronic system dedicated to video and audio playback, such as a television or a digital versatile disc (DVD) player, or on an electronic system where image display and audio is just one feature of the system, such as a computer. A decoder needs to be added to these electronic systems to allow them to decode the compressed bitstream into uncompressed data, before it can be played back. An encoder needs to be added to allow such electronic systems to compress video and/or audio sequences that are to be transmitted or stored. Both the encoder and decoder need to be added for two way communication.

The encoded bitstream for video contains compressed pictures. A picture is a data structure representing the encoded data for one displayable image in the video sequence. As shown in FIG. 1, a picture 100 is collection of three two-dimensional arrays of pixels, one array for luminance samples 102 and two arrays for chrominance samples 104, 106, i.e., color difference samples. The picture is typically further subdivided into smaller subunits, such as macroblocks 110. A macroblock is a data structure having a 16×16 array of luminance samples 112 and two 8×8 arrays of associated chrominance samples 114, 116. The macroblock 110 in an encoded picture contains a header portion having motion compensation information and 6 block data structures of encoded data. A block is the basic unit for DCT based transform coding and is a data structure encoding an 8×8 sub array of pixels. A macroblock represents four luminance blocks 118, 120, 122, 124 and two chrominance blocks 114, 116.

The chrominance samples are typically sampled at half the sampling rate of the luminance samples in both vertical and horizontal directions, producing a sampling mode of 4:2:0 (luminance:chrominance:chrominance). The color difference can also be sampled at other frequencies, for example one-half the sampling rate of the luminance in the vertical direction and the same sampling rate as the luminance in the horizontal direction, producing a sampling mode of 4:2:2.

Both MPEG-1 and MPEG-2 support multiple types of coded pictures: Intra (I) pictures, Forward Predicted (P) pictures, and Bidirectionally Predicted (B) pictures. I pictures contain only intrapicture coding. P and B pictures may contain both intrapicture and interpicture coding. I and P pictures are used as reference pictures for interpicture coding.

Intrapicture coding for I pictures involves the reduction of redundancy between the original pixels in the macroblocks using block based DCT techniques, although other coding techniques can be used. For P and B pictures, intrapicture coding involves using the same DCT based techniques to remove redundancy between interpicture prediction error pixels.

In interpicture coding, the redundancy between two pictures is eliminated as much as possible and the residual differences, i.e., interpicture prediction errors, between the two pictures are transmitted. In scenes where objects are stationary, the pixel values in adjacent pictures will be approximately equal. In scenes with moving objects, block based motion compensated prediction, based on macroblocks, is used. For each macroblock in a P picture, the best matching 16×16 block in the previous picture, (called the prediction block) is found, and the resultant macroblock prediction error is then encoded. The match is determined by searching in the previous picture over a neighborhood of the pixel origin of the current macroblock. The motion vectors between the current macroblock and the prediction block are also transmitted in interpicture coding that uses motion compensation. The motion vectors describe how far, and in what direction, the macroblock has moved compared to the prediction block. As shown in FIG. 2, for B pictures the best matching block 142, the prediction block, in the previous picture 140 and the best matching block 148, the prediction block in the future picture 146 is found, and averaged. This may then be summed with a set of decoded error terms of the block data structures of macroblock 152 to produce the macroblock 152 in the current picture 150. This entire process is referred to as motion compensation.

Once a picture is decoded it can be displayed, typically on a display screen in, or connected to, the electronic system by reading words of data in the picture out of memory and sending them to the display.

SUMMARY OF THE INVENTION

A memory in accordance with the present invention includes a plurality of memory words for storing a digital array of data bytes having rows and columns. The digital array is partitioned into two or more tiles, each having a predetermined number of rows and columns. The data in the first row of one of the tiles is in a first word. The data in each subsequent row of that tile is in a word having a word address adjacent and subsequent to the word storing the data of the directly preceding row. This allows easy retrieval of the subsequent row upon the retrieval of the preceding row. The data in the first row of a tile is stored in a word having an address adjacent to and subsequent to the address of the last word of an adjacent tile in a directly preceding stripe.

In operation, the digital array of data bytes is partitioned into one or more stripes, each of which is then partitioned into two or more tiles. Each tile has a predetermined number of rows and columns. The data in the first row of one of the tiles is stored in a first word and the data in each subsequent row of the tile is stored in a word having a word address adjacent and subsequent to the word storing the data of the directly preceding row.

An arbitrary array portion of the digital array is retrieved from the memory. The word address of the word storing the column and the row corresponding to the first datum of the array portion is determined. The number of tiles that contain data in the array portion is also determined. The desired array portion is then read from memory by reading a part of each title in one memory burst.

Each tile has X rows and Y columns. The digital array is retrieved for display by: (a) reading data in a word having a word address, the word storing data of one row of one of the tiles; (b) reading data in a word having a word address equal to the word address read in step (a) plus X. Repeating step (b) each time incrementing the word address by X until data row of the digital array is read and then reading the data in a word whose word address is equal to the word address read in step (a) plus 1.

The novel features believed characteristic of the invention are set forth in the appended claims. The nature of the invention, however, as well as its features and advantages, may be understood more fully upon consideration of illustrative embodiments when read in conjunction with the accompanying drawings, wherein:

Parts common to FIGS. 1 through 9 are indicated using the same numbering system.

DETAILED DESCRIPTION OF THE PREFERRED EMBODIMENT

An encoded picture or sequence of pictures, such as a video sequence needs to be decoded and then displayed. The decoded picture, hereinafter picture, is stored in the memory for access when the picture is needed to decode other pictures and when the picture is to be displayed. As explained below, the memory architecture used to store the picture needs to be configured to keep the bandwidth low when retrieving the picture or macroblock in the picture to decode other pictures, and to keep the latency low when retrieving the picture for display.

Interpicture coding requires a decoder to have access to the previous and/or future pictures, i.e., the I and/or P pictures, that contain information needed to decode or encode the current image. These previous and/or future images need to be stored and then used to decode the current image, which also needs to be stored as it is being decoded. These pictures are typically stored in memory buffers. The luminance Y and the two types of chrominance Cb and Cr components of each picture are typically stored independently, each typically stored in a memory buffer. Therefore, each picture requires three buffers. However, as in the current memory architecture, the two types of chrominance Cb and Cr components can be stored together, requiring only two buffers per picture. One byte of storage is required for each pixel in each of these three picture blocks. A decoder capable of interpicture coding using both forward and backward prediction, i.e., both I, P, and B pictures, requires buffers for the previous and future reference pictures and for the picture being decompressed. If a field memory storage technique is chosen, to accommodate interlaced video or image sequences twice as many buffers will be needed as for a non-interlaced sequence, because in interlaced video or image sequences only half the pixels are present in successive pictures. These buffers can be half as big as the buffers for non-interlaced video. All of the above buffers can be in one memory device.

A typical MPEG-2 decoder for a Phase Alternation Line (PAL) requires 16 Mbits of memory to operate in the main profile at main level mode (MP at ML). This means that the decoder requires a 2 Mbyte memory.

Figure 1:
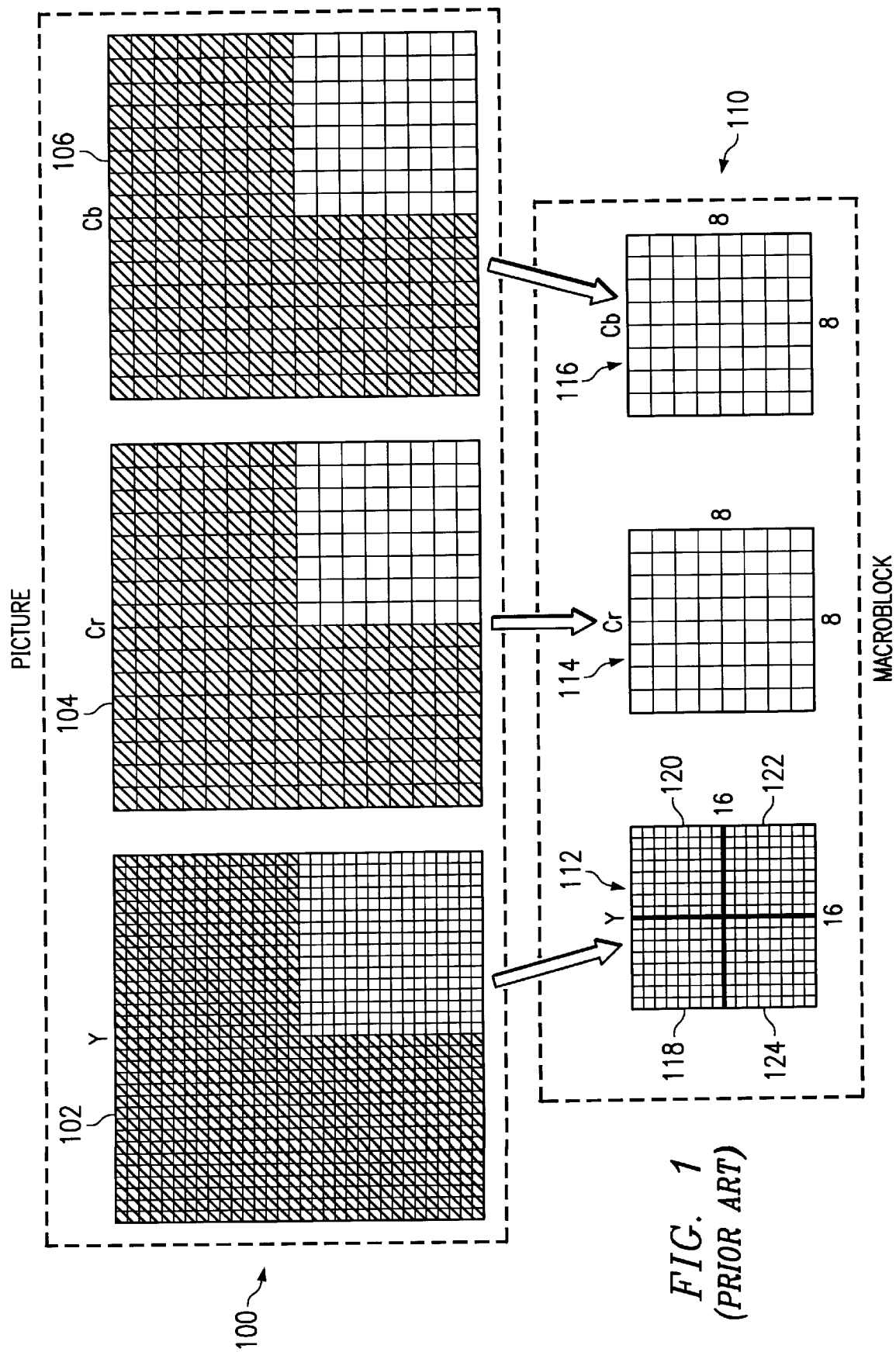
FIG. 1 is a block diagram of an MPEG picture and macroblock in a 4:2:0 format.
Figure 2:
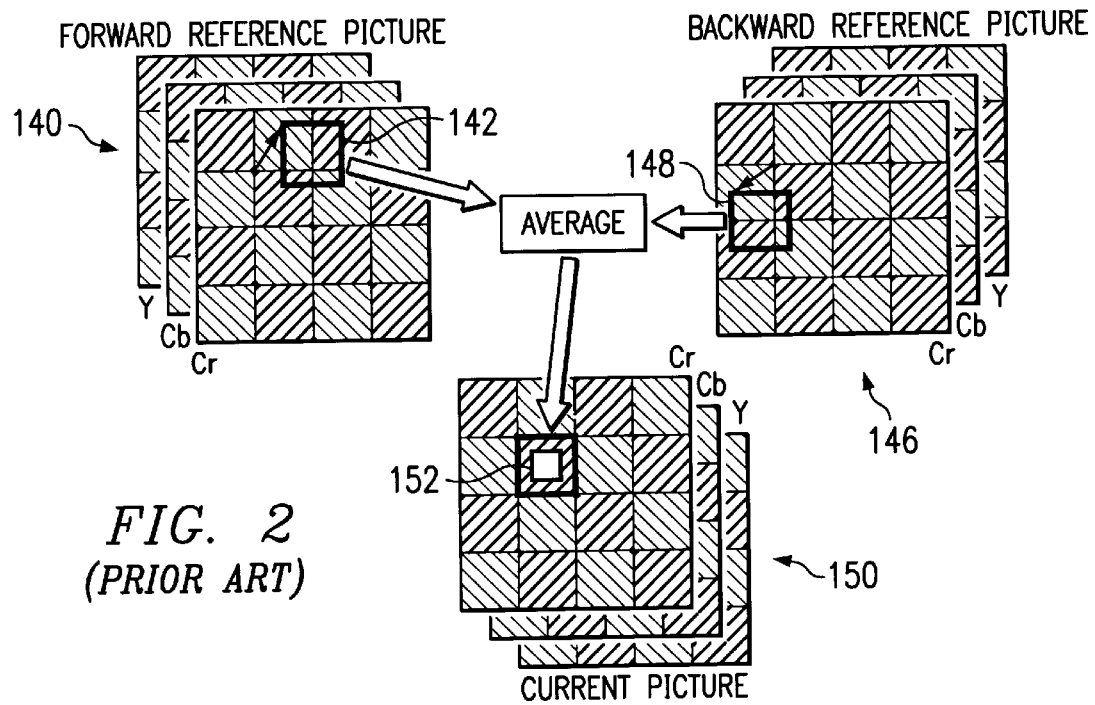
FIG. 2 is a block diagram of MPEG motion compensated prediction.
Figure 3:
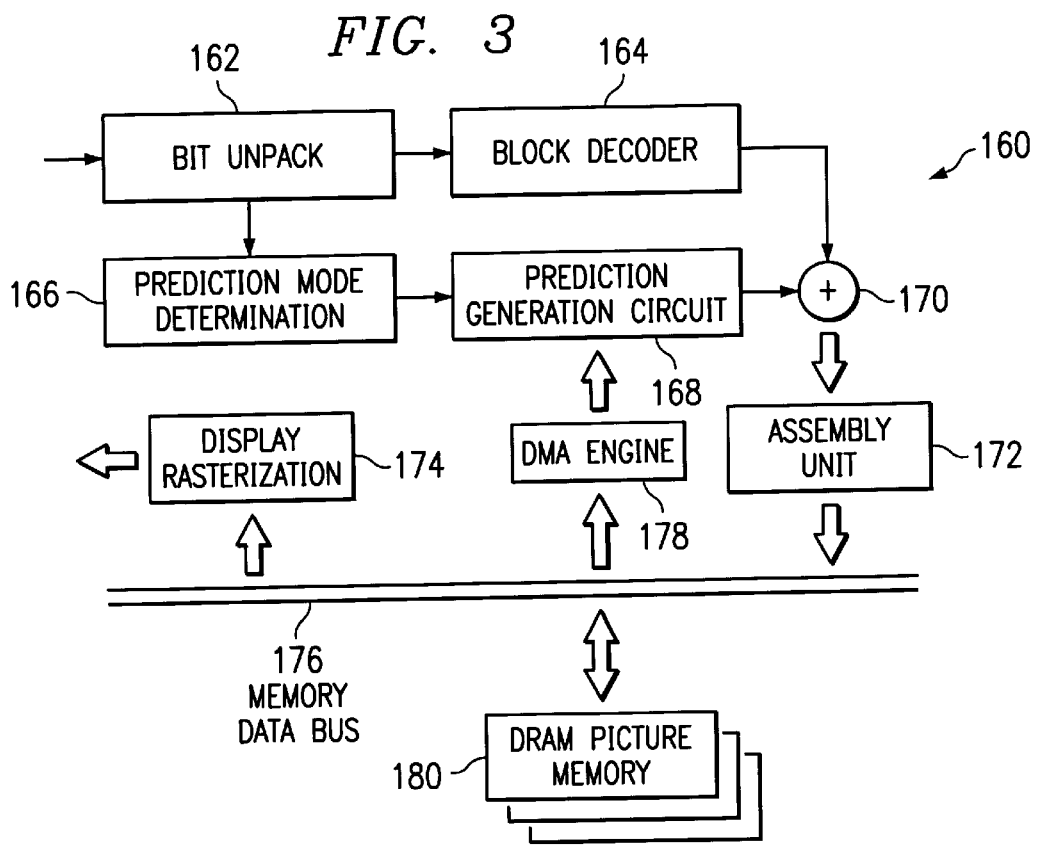
FIG. 3 is a block diagram of a video decoder that can be used with the present invention.

Referring to FIG. 3, a decoder 160 that can be used with the present invention is shown. The decoder 160 can be any decoder that needs to access data of a considerable size in order to decompress the bitstream, such as a video or image decoder. FIG. 3 specifically shows a decoder 160 that uses motion compensated prediction in decompressing frames. Nevertheless, those skilled in the art will appreciate that a decoder that uses different decoding techniques can be used to practice the present invention. Although the invention is most useful for video or image (e.g., JPEG, M-JPEG, H.261, H.263, MPEG-1 and MPEG-2) decoders because of the large size of the images, the decoder 160 can be a video and audio, or a stand alone video or audio decoder.

The encoded bitstream is received by a bit unpack circuit 162. The bit unpack circuit typically contains a first-in-first-out (FIFO) buffer, although the buffer can be any type of memory, and a macroblock (MBLK) parser. The FIFO buffers the incoming encoded bitstream as previously received data is being decoded. The output of the FIFO is coupled to the MBLK parser. The MBLK parser parses the information into macroblocks, and then parses each macroblock and sends the header portion of each macroblock to a prediction mode determination circuit 166. The prediction mode determination circuit 166 determines the type of prediction to be performed to determine which frames a prediction generation circuit 168 will need to access. The prediction mode determination circuit 166 also determines the word address in memory 180 where the frame, and the prediction block within the frame, that is needed to form the motion compensation prediction is located. These addresses are computed using the prediction modes and motion vectors. Typically, there is a DMA engine 178 in the decoder that controls all of the interfaces with the memory 180. Since the required prediction block may be located at half-pixel boundaries, as is possible in the MPEG and H.263 standards, it may be needed to compute such a block by averaging the two prediction blocks located at either side of the half pixel location. This function is performed by the prefetch and ½-pixel filter circuits. The prediction generator circuit forms the final motion-compensated prediction block by averaging the ½ pixel filtered prediction blocks that have been generated from forward and backward reference pictures. This decodes motion compensation prediction.

The MBLK parser also sends the encoded block data structures of each macroblock to a block decoder 164. In the case of non-intracoded macroblocks, the block decoder 164 decodes the interpicture prediction errors in the block. The motion compensation prediction and the prediction errors are summed in the summing circuit 170 and passed to the assembly unit 172. In the case of intracoded macroblocks, the block decoder directly decodes the pixels in the macroblock. The summing circuit in such case merely passes through these pixels to the assembly unit.

Because in interpicture compression some frames require access to future frames to be decoded, the required frames should be sent before the frame that requires them. In the MPEG standards, frames can require both past and future frames for decompression, therefore the compressed frames are not sent in the same order that they are displayed in the video sequence. The assembly unit 172 ensures that the information is placed in the correct place in memory to correspond to the frame being decompressed. The resulting decoded macroblock now needs to be stored in the memory 180 in the place designated for in by the assembly unit 172.

When each macroblock is being decoded, it and its reference macroblocks need to be obtained from the memory. The decoder should be able to access the memory quickly enough to be able to operate in real time. This means that the decoder should be fast enough to be able to access and process the entire picture in the time between screen refreshes, which is typically 1/30 of a second, with the human viewer not being able to detect any delay in the decoding. A goal is to have the decoder operate in real time without dropping so many pictures that it becomes noticeable to the human viewer of the movie. Ideally, the decoder would operate fast enough so that no pictures are dropped. If the decoder does not operate in real time, the decoded movie would stop and wait periodically between images until the decoder can get access to the memory to process the next image.

The computer can also contain both a decoder and encoder to allow for video telephony, as described above. In this case, not operating in real time would mean that the length of time between the occurrence of an event, such as speaking, at one end of the conversation, and the display of the event at the other end of the conversation, is increased by the time both the encoder and then the decoder must wait to get access to the bus and the main memory. Not being able to operate in real time means that there would be gaps in the conversation until the equipment can catch up. This increases the time needed to have a video conference, and more importantly, makes the conference uncomfortable for the participants.

The decoder can share a memory with the computer as described in pending U.S. Patent Applications entitled: "Video and/or Audio Decompression and/or Compression Device that Shares a Memory" by Jefferson E. Owen, Raul Z. Diaz, and Osvaldo Colavin, Ser. No. 08/702,910, incorporated herein by this reference.

When the decoder is sharing memory with the computer, there are typically many components in the computer systems that may require access to the main memory as well. These devices are typically all coupled to the same bus as the decoder, or possibly to several buses if there are not enough connectors on one bus to accommodate all of the peripherals. However, the addition of each bus is very expensive. Each request to access the memory is typically processed according to a priority system. The priority system is typically based on the priority given to the device and the order in which the requests are received. Typically, the priority system is set up so no device monopolizes the bus, starving all of the other devices. Good practice suggest that no device on the bus require more than approximately 50% of the bandwidth of the bus.

The minimum bandwidth required for the decoder can be calculated based on the characteristics and desired operation of the decoder. These characteristics include the standard to which the bitstream is encoded to comply with, whether the decoder is to operate in real time, to what extent pictures are dropped, and how the images are stored. Additionally, the latency of the bus that couples the decoder to the memory should be considered.

If the memory bandwidth required by the particular decoder implementation exceeds the available memory bandwidth of the memory system in that implementation, the decoder will not be able to decode pictures in real time. In such case, to avoid having to decode and display pictures slower than real time, the decoder will regularly have to drop pictures. This allows the decoder to reduce the effective memory bandwidth required, enabling it to "catch up" periodically. However, regular picture dropping produces poor continuity in the displayed video. Introducing artifacts like jerky appearance of sequences containing smooth motion. A more severe problem occurs in video or image sequences encoded to the H.26X or MPEG-X standards, or any other standard that uses temporal compression. In temporal (intetpicture) compression, some of the images are decoded based on previous images and some based on previous and future images. Dropping an image on which the decoding of other images is based is unacceptable, because the decoding of all future dependent pictures will be in error. This results in extended periods of poor or even completely unrecognizable images.

One widely used solution to allow a component in a computer system to operate in real time without regularly dropping too many pictures, is to give the component its own dedicated memory. Thus, the decoder can be given its own dedicated memory, with a dedicated bus to connect the decoder to its dedicated memory. The decoder will also require additional pins to interlace to the memory increasing the size of the decoder. The dedicated memory and the pins needed to interface with it significantly increase the cost of adding a decoder to the computer. A disadvantage of a computer equipped with such a decoder is that it has a non-negligible amount of memory that is unused most of the time.

Indeed, the dedicated memory is only used when decoded images are being viewed on the computer screen or need to be encoded, which only amounts to a fraction of the time for typical computer usage. This memory, inaccessible to the other peripherals or to the CPU, typically requires a size of 512 Kbytes in an MPEG-1 decoder, and a size of 2 Mbytes in an MPEG-2 decoder. Further, this memory is oversized, since it is obtained by using currently available memory components.

Additionally, as is becoming common, if the decoded pictures must be further processed by other software methods (e.g., composited with graphics data, morphed, or filtered), before being displayed, the decompressed data must be transmitted to the main memory of the computer and then to the display device. This again adds to the memory bandwidth load of the main memory, offsetting the advantages of using a separate decoder memory.

Therefore, it is advantageous for the decoder to share memory with the computer, for example to share the computer's main memory, without taking up so much bandwidth that it starves other devices connected to the memory, but still allowing the decoder to operate in real time. In this situation, the choice of how pixels in the decoded pictures are mapped to memory addresses in the main memory directly determines the memory bandwidth required by the decoding process, and hence the extent to which the decoder can operate in real time.

The block based motion compensation algorithm specified by the MPEG-X or H.26x video standards requires the retrieving of prediction blocks and the storage of decoded macroblocks in the image (pixel) coordinate space. Hence in this coordinate space, the peak number of pixels transferred per second is fixed a priori by the algorithm itself. The encoded bit mode and encoding methods determine the average bandwidth. However, different pixel locations in the picture coordinate space are mapped into different byte locations in the memory, and the access to a portion of a picture must be decomposed into a number of atomic transfers, each involving the transfer of a certain number of bytes or words. Since an overhead delay is incurred with each atomic transfer, it follows that the total number of clock cycles required to retrieve a block of pixels increases with the number and size of each of these atomic transfers. Consequently, the actual memory bandwidth is in large part dictated by the picture memory mapping that directly determines how a macroblock or prediction block of pixels is written into and retrieved from the storage memory.

The most efficient transfer mode is a burst mode transfer, where a command to access a block of N words takes N+M cycles, where M is the burst mode overhead that is independent of N. This is in contrast to nonburst mode transfers, where an N word access requires kN+M cycles, where typically k>1. Therefore, a burst mode memory is preferred. Additionally because of the large size of the picture, typically a DRAM is preferred, such as burst EDO or SDRAM, although other memories can be used. Burst mode DRAMs are logically organized as a linear array of words, with each word being an integral number of bytes (e.g., 32 or 64 bits or 128 bits). Data can be accessed at clock edges in units of 1, 2, 4, 8, or 16 bytes. An overhead of a certain number of block cycles is associated with each form of burst data transfer. Typically, this overhead is a combination of access delay and the time required for DRAM refresh precharge. Since the delay per burst is fixed, minimizing the number of bursts per macroblock or prediction block of pixels directly minimizes the number of clock cycles required to transfer each such macroblock or prediction block, which in turn minimizes the memory bandwidth consumed by the overall decoding process.

Figure 4:
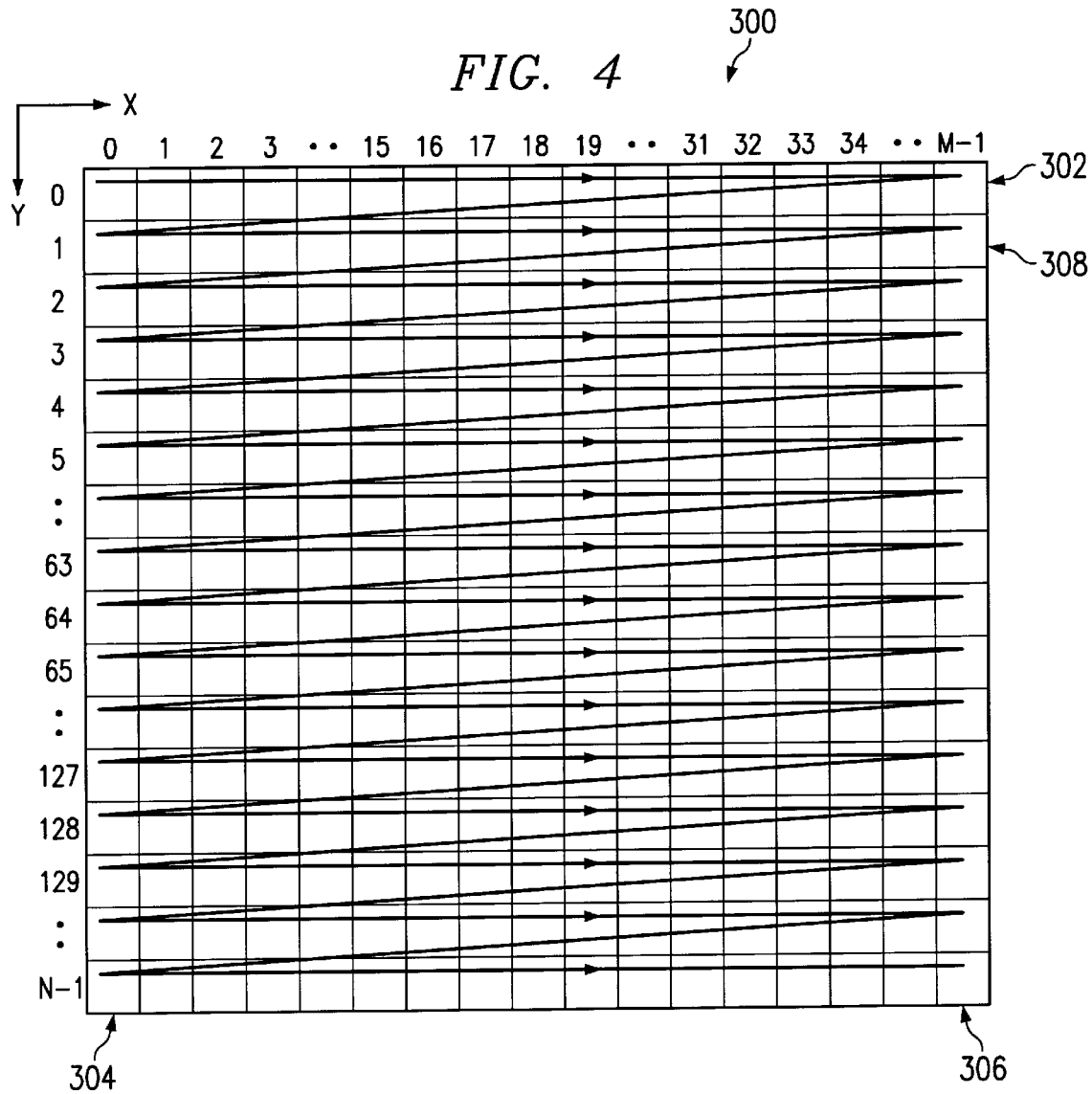
FIG. 4 is a block design showing the order pixels of a picture are retrieved for display.

A memory architecture designed to reduce the bandwidth and the latency in the decoding process is described in pending U.S. Patent Applications entitled: "Picture Memory Mapping To Minimize Memory Bandwidth In Compression And Decompression Of Data Sequences" by Jeyendran Balakrishnan and Jefferson E. Owen, application Ser. No. 08/972,917, now U.S. Pat. No. 6,028,612 incorporated herein by this reference. This is accomplished by dividing the picture into stripes and storing the pixels in a row of one stripe in a word whose word address is right after the word where the pixels of the immediately preceding row are stored. However, this memory architecture can lead to significant latency when the picture is retrieved to be displayed. Currently, rasterization is used in displaying a picture. Referring to FIG. 4, each pixel in a first row 302 of the picture 300 is sent to a buffer, typically a FIFO, and then to a display, typically a screen, starting from the pixel leftmost column 304 of the row 302 and continuing until the rightmost column 306 of the row 302. Then, each pixel in the following row 308 starting from the pixel in the leftmost column 304 is sent to the screen. This continues for each row of the picture.

Figure 5:
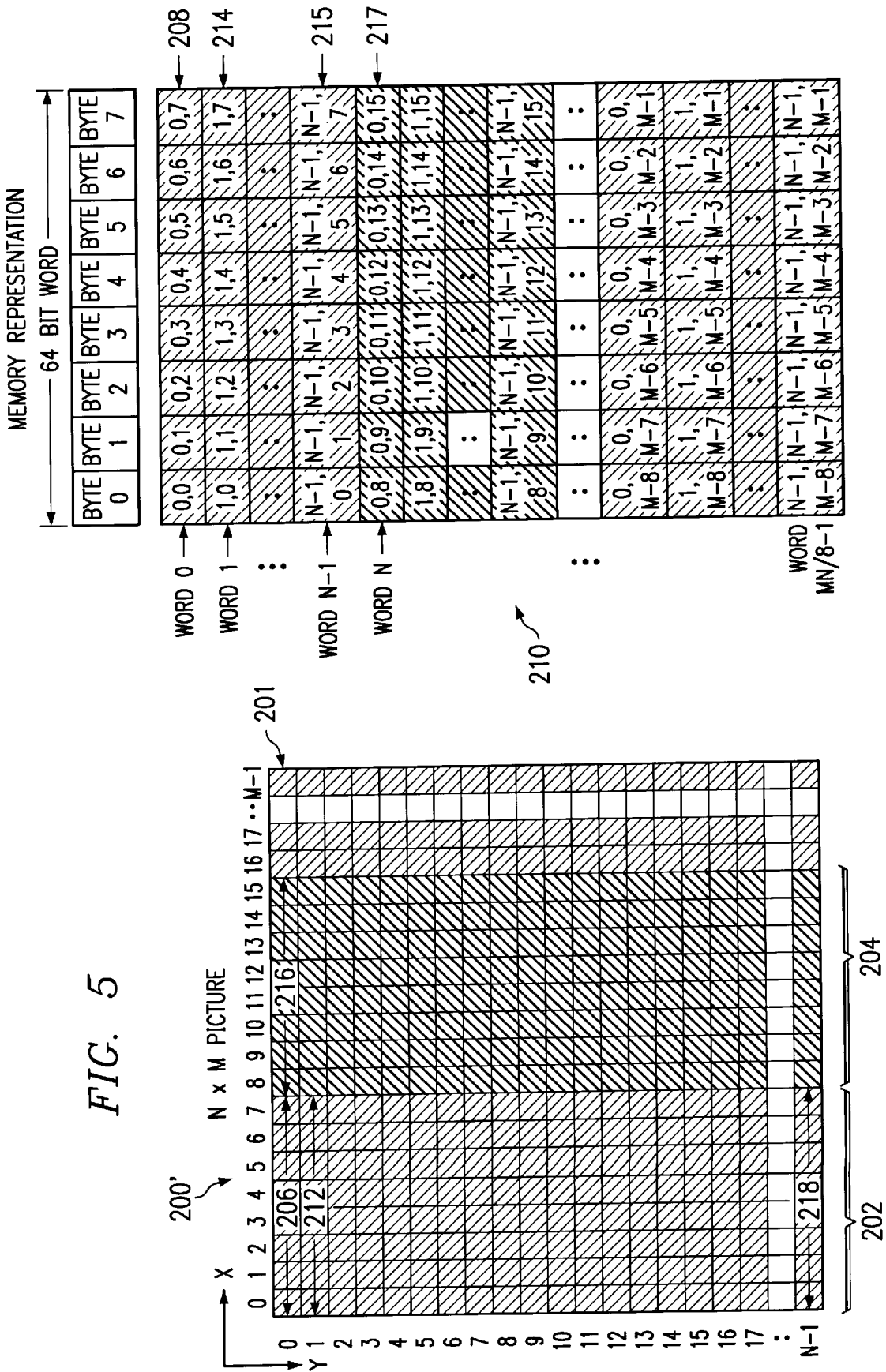
FIG. 5 is a block diagram showing the storage format of a frame picture in a frame organized memory and a field picture in a field organized memory when the picture is subdivided into stripes.

When the picture is divided into stripes and the pixels in a row of one stripe are stored in a word whose word address is right after the word where the pixels of the immediately preceding row are stored, as shown in FIG. 5, the pixels in one row 201 can be stored far apart. The pixels in the first row 206 of the first stripe 202 are words away from the pixels in the first row 216 of the second stripe 204. If the stripe is long, N will be large, and the Nth word can be on different memory pages, making them far enough away that the pixels will not be retrievable in one burst in page mode access. Each access to words on a different memory page has a latency of 10 cycles, drastically increasing the time to retrieve pixels in corresponding rows 206 and 216 of adjacent stripes to display the row of the picture.

Figure 6:
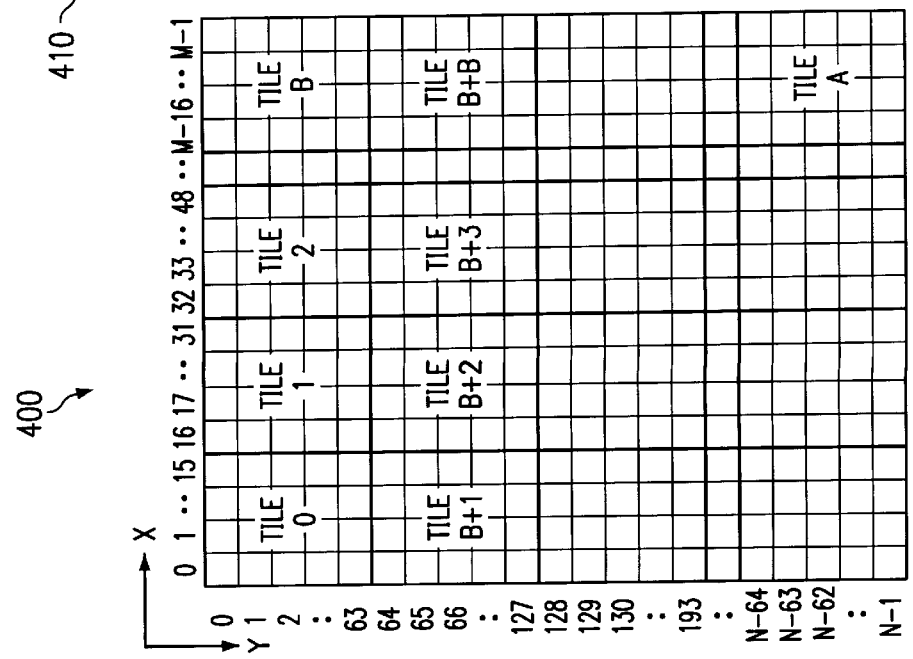
FIG. 6 is a block diagram showing the storage format of tiles in a memory according to an embodiment of the current invention

Referring to FIG. 6, the current invention divides the picture into A tiles T0 . . . TA−1 having a predetermined number of rows and columns. The number of rows in each tile is a compromise between trying to keep the number of rows in a tile small enough that when the tile is stored right after the tile immediately to its left the pixels in one row of the picture are close enough to be retrieved in a reasonable number of bursts in page mode access, yet large enough to allow a prediction block to be retrieved in one to two bursts.

Each tile is stored in memory right after the tile immediately to its left. The first tile in a row of tiles TB+1 is stored immediately after the last tile TB of the preceding row of tiles. Increasing the number rows in each tile increased the efficiency of the decoding of the macroblock, and reducing the number the rows in each tile increases the efficiency of the rasterization. For a 32 word FIFO, each word being 16 bytes long, when each tile has 64 rows, a maximum of 2 bursts is required to fill the FIFO. This allows the FIFO to be filled quicker than the pixels in the FIFO need to be sent to the screen.

The memory structure of the present invention is to store frame pictures in progressive video or image sequences, or still images (e.g., JPEG, M-JPEG, H.261, H.263, MPEG1 and progressive MPEG-2 video sequences) in frame buffers. This is referred to as frame organized memory. In the case of interlaced sequences (e.g., interlaced MPEG-2 sequences), a field organized memory is used. Here, each field picture is stored in a field picture buffer, whereas a frame picture is logically partitioned into top and bottom fields and stored in separate field picture buffers. A field organized memory minimizes the memory bandwidth required for processing interlaced sequences (compared to frame organized memory) because such processing requires the reading and writing of rectangular pixel blocks from individual fields. A further advantage of field organized memory is that the field buffers can be directly transmitted to the display device (further reducing memory bandwidth), in the case of interlaced displays like television monitors.

Figure 7:
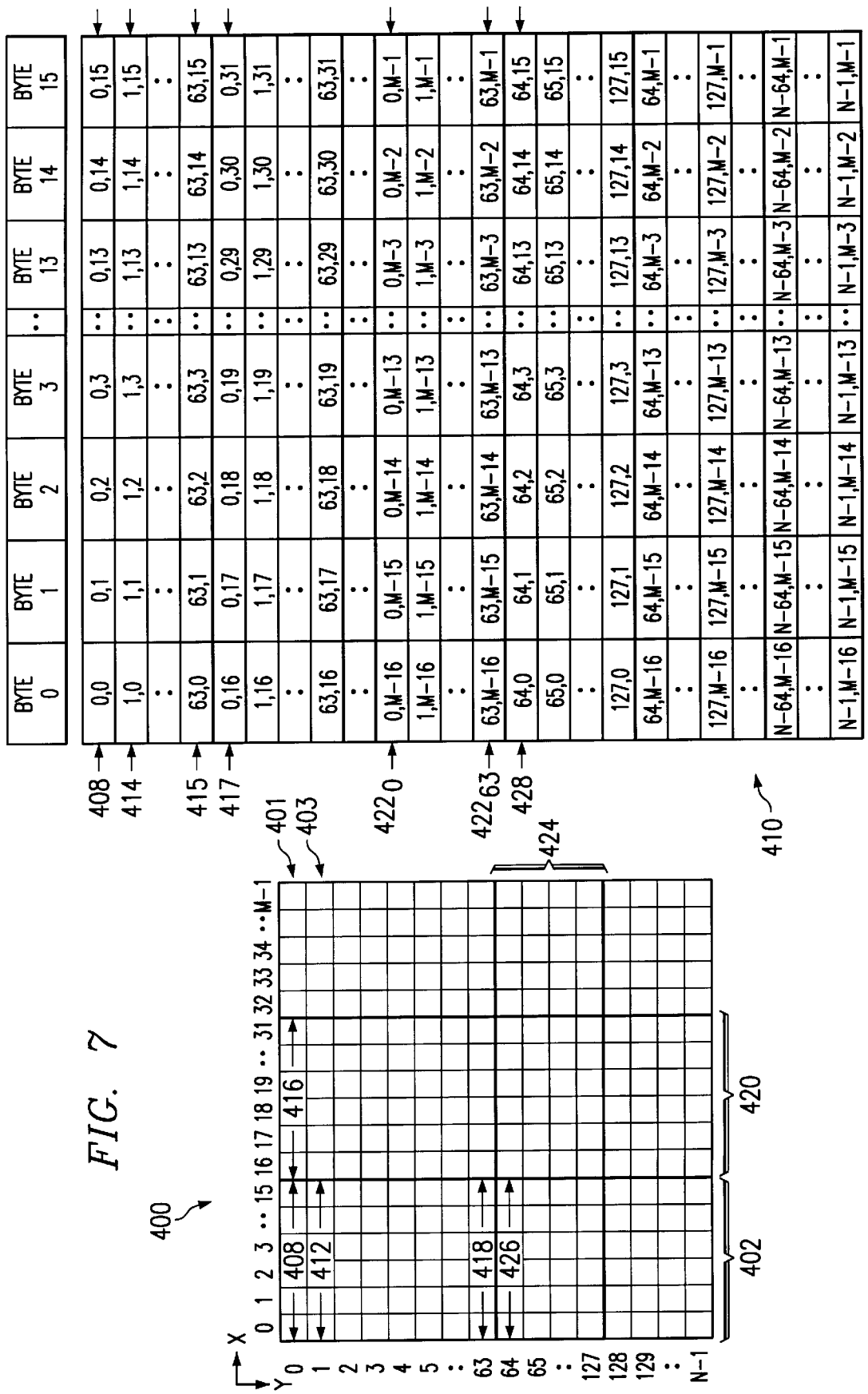
FIG. 7 is a block diagram showing the storage format of a frame picture in a frame organized memory and a field picture in a field organized memory according to an embodiment of the current invention.

The mapping of the frame picture into a memory buffer in a frame organized memory or of a field picture in a field organized memory will now be described. FIG. 7 shows a digital array, such as a picture, designated generally by reference number 400 and a memory buffer designated generally by the reference number 410. The picture 400 represents one of the components, either luminance or both chrominances, of one of the pictures used for prediction, either I, P, or B picture. The memory buffer 410 is part of the memory of the device that contains the decoder. The memory is preferably shared with other components of the device the decoder is in (e.g., the main memory of a computer), although it can be a dedicated memory. The method of mapping the frame picture into a memory buffer in a frame organized memory or of a field picture into a field organized memory is the same for all of the pictures used for prediction, I, P, or B, and for all color components of the picture (e.g., luminance or both chrominance component in YUV coordinates, or red, green or blue component in RGB coordinates). Therefore, for ease of reference the method of mapping the picture 400 into the memory buffer 410 will be described with reference to one representative picture 400. Since each of the chrominance components are sampled at half the frequency of the luminance components there are half as many pixels of chrominance as luminance.

In one embodiment of the present invention, both chrominance components are stored in one word, the first 8 bytes of each word contain pixels of Cr chrominance components and the second 8 bytes of each word contain pixels of Cb chrominance components. The order of the components can be reversed. Interlacing the chrominance Cr and Cb components in such a manner allows the chrominance components to be retrieved in one word, reducing latency during rasterization, and because all of the chrominance for one tile can still be retrieved in one burst the time to retrieve the chrominance for decoding is not increased. The luminance is retrieved and stored in a FIFO and both chrominance components are retrieveed and stored in a second FIFO. The pixels cannot be displayed until all three components are retrieved and combined, therefore when the chrominance components are stored together the first pixel is displayed earlier. Additionally, the first FIFO stores 16 byte words, since the luminance is divided into stripes of 16 pixels, and the second FIFO also stores 16 byte words, since pixels of both chrominance components are stored in each word. Storing the chrominance components so interlaced enables the FIFO that stores the chrominance to have the same structure as the FIFO storing the luminance. When the chrominance components are not interlaced, the luminance components are retrieved and stored in the FIFO, one of the chrominance components Cr is retrieved and stored in a second FIFO, and the other chrominance components Cb is retrieved and stored in third FIFO. The second and third FIFOs store 8 byte words, since each of the chrominance Cr and Cb is divided into stripes of 8 pixels, requiring a different structured FIFOs.

In another embodiment of the present invention, all three components, luminance Y and both chrominance Cr and Cb, are stored in one 32 byte word, the first 16 bites of each word contain pixels of the luminance components, the next 8 bytes of each word contain pixels of Cr chrominance components and the next 8 bytes of each word contain pixels of Cb chrominance components. The order of the components can be changed. Interlacing the three components allows all of the components to be retrieved in one word, reducing latency during rasterization without increasing the time needed to retrieve pixels for decoding because all of the components for one tile can still be retrieved in one burst.

The picture 400 has N rows and M columns. The memory buffer 410 also has rows and columns and is subdivided into words. Preferably, each word is 128 bits, however words of any length can be used.

The picture is vertically partitioned into one or more stripes. Each of the stripes has 16 columns. This puts 16 pixels into each row in the stripe. 16 pixels will fit into one 128-bit memory word. More generally, the stripes can have any predetermined number of columns Y as long as the number of bytes needed to fit the number of pixels in one row of a stripe is equal to the number of bytes in one memory word. This allows the storing of the data in one row of a stripe into one word. Each stripe is then partitioned into tiles. Each tile has a 64 rows and 16 columns. The tiles can have any predetermined number of columns as described above, and any predetermined number of rows, such as 16, 32, 64, 128 or any other number, as long as when the tile is stored right after the tile immediately to its left the pixels in one row of the picture are close enough to be retrieved in a reasonable number of bursts in page mode such that the FIFO that stores the pixels to be sent to the screen can be filled quicker than the pixels in the FIFO that need to be sent to the screen. Increasing the number rows in each tile increases the efficiency of the decoding of the macroblock, and reducing the number the rows in each tile increases the efficiency of the rasterization. For a 32 word FIFO, each word being 16 bytes long, when each tile has 64 rows, a maximum of 2 burst are required to fill the FIFO.

A location in memory is selected as the first word 408, and the data in the first row 406 of the first tile 402 of the picture, is stored in the first word 408. The data in a subsequent row 412 of the first tile is stored in the next word 414. This is continued until the last row 418 of the tile. Storing a row of the tile 402 in a word directly after the word that stores the preceding row of the tile 402 enables easy retrieval of the rows in a single burst, reducing the bandwidth required for the decoding process.

In the first row 416 of next tile 420 is stored a word 417 having a word address adjacent and subsequent to the word 415 storing the data of the last row 418 of the first tile 402, which is the adjacent tile in a directly preceding stripe (i.e., the tile directly on the left). This facilitates easy retrieval of rows in the next tile 420 upon the retrieval of a row or rows of the adjacent tile to the right. The above process is repeated for each adjacent tile proceeding to the right until the rows of the rightmost tile are stored in words $422_0$ through $422_{63}$.

This process is then repeated for the tiles immediately below, with the first row 426 of the tile 424 immediately below the first tile 402 stored in a word 428 having the word address immediately subsequent to the word $422_{63}$ storing the rightmost word of the last tile in the preceding row of tiles. This is repeated until the data in all of the tiles is stored in memory 410.

When the typical prediction block to be accessed from the picture has more or equal number of pixels vertically than horizontally, it is advantageous for tiles to be vertical, i.e. the rows are horizontal and the columns are vertical, as described this far. When the prediction block has more pixels horizontally than vertically the reverse is true. It is more advantageous for the tiles to be horizontal, making the rows vertical and the columns horizontal.

Figure 8:
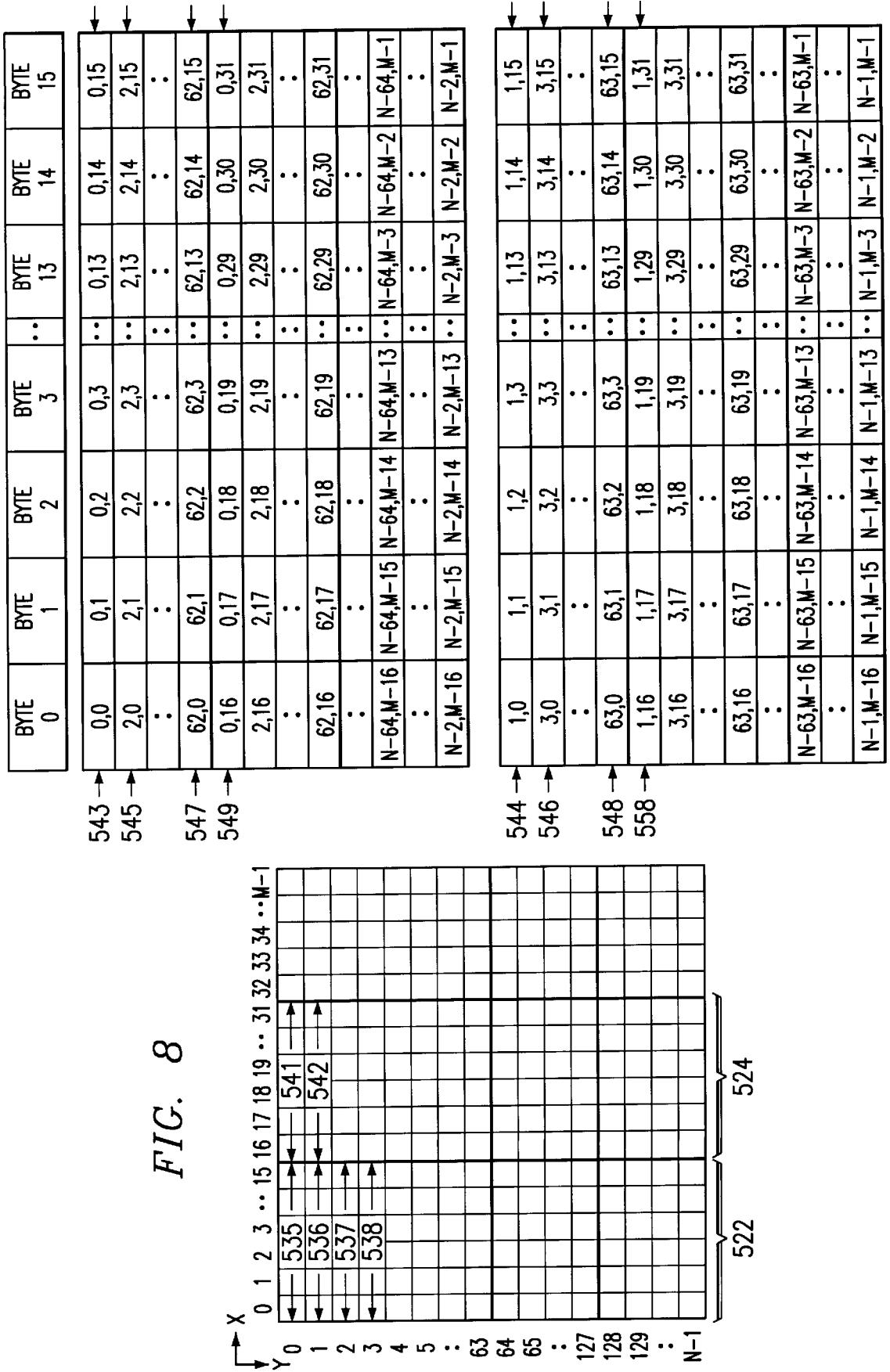
FIG. 8 is a block diagram showing the storage format of a frame picture in a field organized memory according to an embodiment of the current invention.

Mapping frame pictures into a memory buffer in a field organized memory will now be described. FIG. 8 shows a frame picture designated generally by reference number 520 and the corresponding memory buffer designated generally be the reference number 530. Again, the picture 520 is one of the components of one of the pictures used for prediction, e.g., the luminance component of a P picture. The memory buffer 530 is part of the memory of the device that contains the decoder. The memory is preferably shared with other components of the device the decoder is in, although it can be a dedicated memory.

Mapping the frame picture 520 into a memory buffer in a field organized memory 530 is the same for all of the pictures used for prediction, I, P, or B, for any color component of the picture (e.g., luminance or chrominance in YUV coordinates, or red, green or blue in RGB coordinates), and whether the picture is part of a video or image sequence, or a still image. Therefore, for ease of reference the method of mapping the picture into the memory buffer 530 will be described with reference to one representative picture 520.

The picture 520 has N rows and M columns. The memory has first and second memory buffers 532 and 534 each having rows and columns, and each subdivided into words. Preferably, each word is 128 bits, however words of any length can be used.

As in the previous case, the picture is partitioned into one or more stripes, which are then partitioned into tiles. Each of the tiles has 16 columns, putting 16 pixels into each row in the tile, and 64 rows. As described above, the tiles can have any predetermined number of rows columns. A location in the first memory buffer 532 is selected as the first word 543 of the first memory buffer 532. The data in the first odd row 535 of the first tile 522 of the picture, is stored in the first word 543 of the first memory buffer 532. The data in the next odd row (i.e., the third row from top) 537 is stored in the next word 545 of the first memory buffer 532. This is continued for the entire tile, mapping alternate rows in the tile 522 to successive words in the first memory buffer 532. A location in the second memory buffer 534 is selected as the first word 544 of the second memory buffer 534. The data in the first even row 536 (i.e., the second row from top) of the first tile 522 is stored in the first word 544 of the second memory buffer 534. The data in the next even row 538 (i.e., the fourth row from top) is stored in the next word 546 of the second memory buffer 534. This is again continued for the entire tile. Storing an odd row of the tile in a word directly after the word that stores the preceding odd row of the tile allows easy retrieval of the odd rows in a single burst, and storing an even row of the tile in a word directly after the word that stores the preceding even row of the tile allows easy retrieval of the even rows in a single burst. This allows the retrieval of a rectangular array portion of one of the interlaced pictures (i.e., of one field) in a single burst, reducing the bandwidth required for the decoding process.

In the first odd row 541 of the next tile 524 is stored a word 549 having a word address adjacent and subsequent to the word 547 storing the data of the last odd row of the first tile 522, which is the adjacent tile in a directly preceding stripe (i.e., the tile directly on the left). The first even row 542 of next tile 524 is stored a word 558 having a word address adjacent and subsequent to the word 548 storing the data of the last even row of the first tile 522. The above process is repeated for each adjacent tile proceeding to the left until the rows of the last tile are stored.

When the typical prediction block to be accessed from the picture has more or equal number of pixels vertically than horizontally, it is advantageous for tiles to be vertical, i.e. the rows are horizontal and the columns are vertical, as described this far. When the prediction block has more pixels horizontally than vertically the reverse is true. It is more advantageous for the tiles to be horizontal, making the rows vertical and the columns horizontal.

Referring to FIG. 7 retrieving the digital array 400 for display will be described. All of the pixels in the first row 406 of the first tile 402 are read by reading the first word 408 of the memory 410. Since there are 16 bytes in a row of a tile the line increment for the read is 16. The pixels in the first row 416 of the next tile are read by reading the word 417 at the word address of the first word 408 plus X. Because the two words 408 and 416 are only 64 words apart, they can both be accessed during the same burst of a page mode access of the memory. This process is continued until all the words containing data in the row 401 are read. The pixels are sent to a buffer and then to a display. After the entire row 401 is sent to the display the next row 403 is read and sent to the display. The next row 403 is read by repeating the above process starting by reading the word 414 having a word address of the first word plus 1. This continues until all of the words are read and sent to the display. Although the first row of the first tile is the starting point in the above any row of any tile can be the starting point, however, only the part of the picture starting from that row will be displayed.

Figure 9:
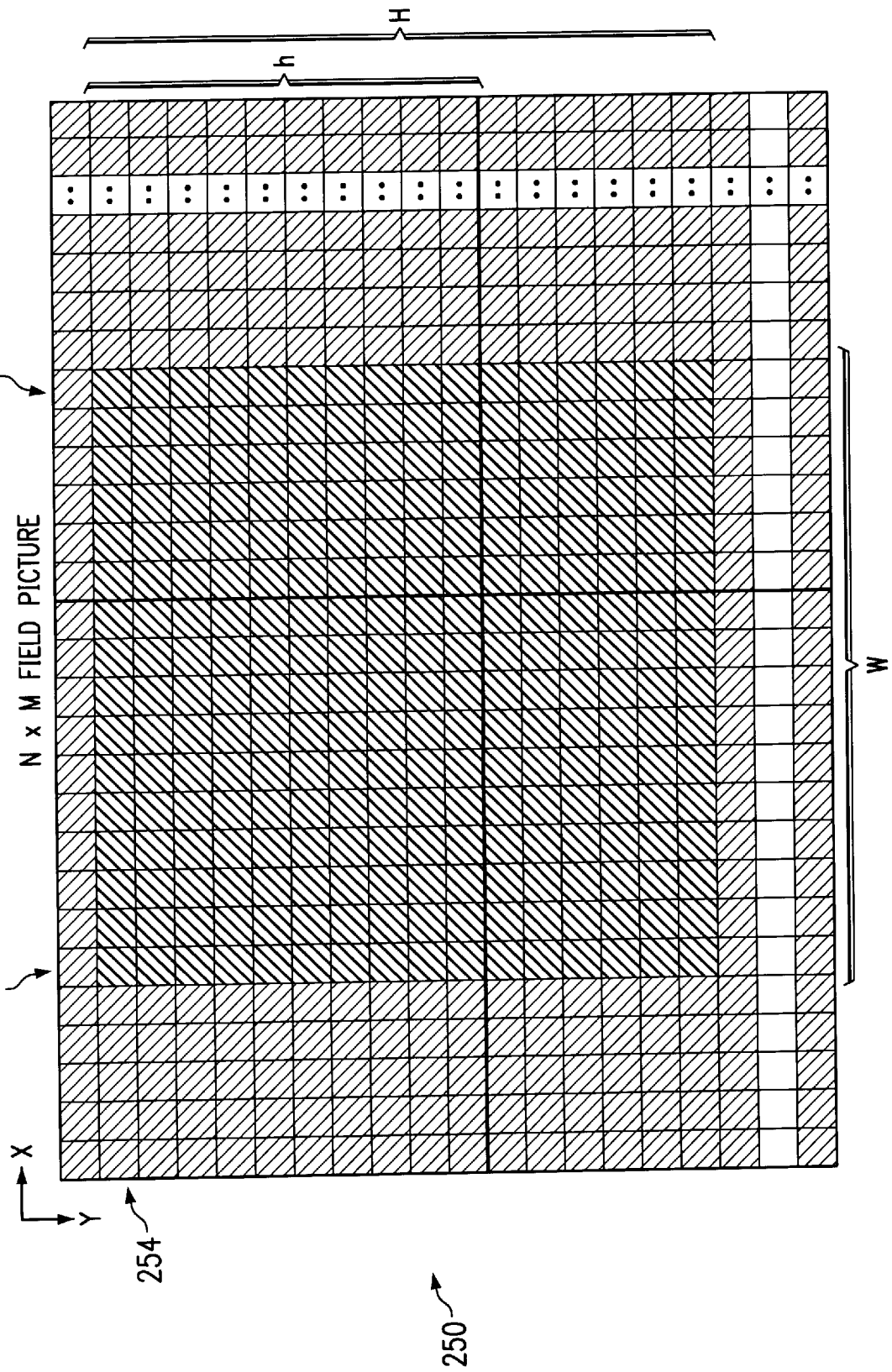
FIG. 9 is a block diagram showing the retrieving of an arbitrary 16×16 block from a memory buffer.

FIG. 9 shows how an arbitrary rectangular array portion 252 of the picture 250 is retrieved from the memory according to an embodiment of the invention. The array portion would be retrieved in the same manner whether the picture is an I, P, or B picture, for any color component of the picture (e.g., luminance or chrominance, red, green or blue), and whether the picture is part of a video or image sequence or a still image. The same method can be used to retrieve any derived array portion of the picture such as a macroblock or a block.

The number of rows and columns of the array portion of the picture and the word address of the word storing row 254, hereinafter first row, and column 258, hereinafter first column, containing the first datum of the array portion of the picture is determined. Let the rectangular array portion to be retrieved have the top left corner pixel located at first row R, and first column Cl, and the array portion's width be W columns and height be H rows. When each tile has X rows and Y columns. The top leftmost tile number to which the array portion belongs is computed as:

T0=(C1 div Y)+[(R1 div X)*(M div X)], and the top rightmost tile number is:

T1=[(C1+W−1)div Y]+[(R1 div X)*(M div X)].

When the all of the rows of the array portion are in only vertically adjacent tiles, for each tile ranging from T0 to T1, the number of rows that is in the desired rectangular array portion is read in one burst of H memory words, starting from the address of the word containing the first row of the array portion R1. When the only h rows of the array portion are in vertically adjacent tiles, as shown in FIG. 9, for each tile ranging from T0 to T1, h rows are read in one burst of h memory words, starting from the address of the word containing the first row of the array portion R1. Then H−h words are read from each of the tiles immediately below tiles T0 to T1 starting from the first word in each of the tiles.

Determining the number of tiles having data in the array portion of the digital array can be performed prior to starting to read the tiles, or can be performed as the tiles are read. For example, by reading the tile and determining that the tile contains the last row and column of the desired array portion.

The leftmost tiles that are read in may have more columns on the left than the desired array portion, while the rightmost tiles may have more columns on the right. Hence for each tile, the columns within the stripe corresponding to the columns in the desired tile are selected, and then stored in the local memory buffer. The aim is to ensure that all columns in the desired rectangular array portion are stored adjacent to each other in the local buffer. There are several ways to accomplish this. One way, is by rotating each word in a tile such that the columns corresponding to the columns in the array portion of the digital array are in the least significant bytes of each word. The correct number of the least significant bytes of each word of each of the tiles read is then stored in the local memory buffer. Another way to accomplish selecting the columns corresponding to the desired array portion of the picture is to rotate each word in a tile such that the columns corresponding to the columns in the array portion of the digital array are in the most significant bytes of each word. The correct number of the most significant bytes of each word of each of the tiles read is then stored in the local memory buffer.

As described above, the memory can be in used in an electronic system dedicated to playback of video and audio, such as a television or a digital versatile disc (DVD) player, or on an electronic system where image display and audio playback is just one feature of the system, such as a computer. It is more advantageous to use the memory in an electronic system where playback is only one of the features, so the memory can be shared.

The present invention requires 1 burst in the best case scenario and 6 bursts in a worst case scenario to retrieve the luminance component of a typical prediction block and 1 burst to write the luminance component of the macroblock being decoded, and the same number of bursts for both chrominance components combined, when the words are 128 bits wide and the tiles have 16 columns, for frame pictures in a frame organized memory or field pictures in a field organized memory. Frame pictures in a field organized memory require twice as many bursts. Other memory mapping schemes typically require many more bursts with the associated additional latency periods.

A memory mapping scheme where the picture is partitioned into tiles with each tile stored immediately subsequent the tile to its left allows the retrieval of a row segment of the picture for display in a reasonable number of bursts of page mode access. Having the rows of the tiles stored in sequential words enables an array portion of a tile to be read in one to two bursts allowing a reduction in the number of burst and in the associated overhead per burst required to retrieve the prediction block needed to decompress a macroblock. This reduces the bandwidth required to decompress a bitstream without greatly increasing the time needed to retrieve the picture for display.

Although the invention has been specifically described with reference to several preferred and alternative embodiments, it will be understood by those skilled in the art having reference to the current specification and drawings, that various modifications may be made and further alternatives are possible without departing from the spirit and scope of the invention as set forth in the appended claims.

I claim:

1. A method of mapping of a digital array of data having rows and columns into a memory subdivided into words having a predetermined number of bytes, comprising the steps of:

partitioning the digital array into one or more stripes, each having a predetermined number of columns, each row of each of the stripes having a number of bytes;

partitioning each stripe into two or more tiles, each having a predetermined number of rows and the predetermined number of columns;

storing the data in the first row of one of the tiles in a first word in the memory;

storing the data in each subsequent row of the tile in a word in the memory having a word address adjacent and subsequent to the word storing the data of the directly preceding row, whereby easy retrieval of the subsequent row is accomplished upon the retrieval of the preceding row.

2. The method of claim 1, further comprising the steps of:

storing each data in a first row of a tile of a stripe in a word having a word address adjacent to and subsequent to the word address of last word of an adjacent tile in a directly preceding stripe; whereby easy retrieval of the words in the tile is accomplished upon the retrieval of the words in the adjacent tile in the directly preceding stripe.

3. The method of claim 1, wherein a first number of bytes of each word contain pixels of Cr chrominance components and a second number of bytes of each word contain pixels of Cb chrominance components, such that the first number and second number of bytes is equal to the number of bytes in one word.

4. The method of claim 1, wherein, the number of bytes in one row of one tile being equal to the number of bytes in one word for storing the data in one row of each tile in one word.

5. The method of claim 1, wherein the predetermined number of rows is 64.

6. The method of claim 1, wherein the memory comprises a burst memory.

7. The method of claim 1, wherein the memory comprises a DRAM.

8. The method of claim 1, wherein the digital array comprises a picture in a video sequence.

9. The method of claim 8, wherein the video sequence comprises an MPEG-2 video sequence.

10. The method of claim 1, wherein the digital array comprises the luminance components of a picture.

11. The method of claim 10, wherein the predetermined number of columns is 16.

12. The method of claim 1, wherein the digital array comprises the chrominance components of a picture.

13. The method of claim 12, wherein the predetermined number of columns is 8.

14. The method of mapping of a digital array of data having even and odd rows and columns into a memory having a first and second memory buffers, each memory buffer subdivided into words having a predetermined number of bytes, comprising the steps of:

partitioning the digital array into one or more stripes, each stripe having a predetermined number of columns, each row of each of the stripes having a number of bytes;

partitioning each stripe into two or more tiles, each having a predetermined number of rows and the predetermined number of columns;

storing the data in the first odd row of one of the tiles in a first word of the first memory buffer;

storing the data in each subsequent odd row of the tile in a word in the first memory buffer having a word address adjacent and subsequent to the word storing the data of the directly preceding odd row, whereby easy retrieval of the subsequent odd row is accomplished upon the retrieval of the preceding odd row;

storing the data in the first even row of the tile in a first word of the second memory buffer;

storing the data in each subsequent even row of the tile in a word in the second memory buffer having a word address adjacent and subsequent to the word storing the data of the directly preceding even row, whereby easy retrieval of the subsequent even row is accomplished upon the retrieval of the preceding even row.

15. The method of claim 14, wherein a first number of bytes of each word contain pixels of Cr chrominance components and a second number of bytes of each word contain pixels of Cb chrominance components, such that the first number and second number of bytes is equal to the number of bytes in one word.

16. The method of claim 14, further comprising the steps of:

storing each data in a first even row of a tile of a stripe in a word having a word address adjacent to and subsequent to the word address of last even word of an adjacent tile in a directly preceding stripe; whereby easy retrieval of the words in the tile is accomplished upon the retrieval of the words in the adjacent tile in the directly preceding stripe;

storing each data in a first odd row of a tile of a stripe in a word having a word address adjacent to and subsequent to the word address of last odd word of the adjacent tile in the directly preceding stripe; whereby easy retrieval of the words in the tile is accomplished upon the retrieval of the words in the adjacent tile in the directly preceding stripe.

17. The method of claim 14, the number of bytes in one row of one tile being equal to the number of bytes in one word for storing the data in one row of each of the tiles in one word.

18. The method of claim 14, wherein the predetermined number of rows is 64.

19. The method of claim 14, wherein the memory comprises a burst memory.

20. The method of claim 14, wherein the memory comprises a DRAM.

21. The method of claim 14, wherein the digital array comprises a picture in a video sequence.

22. The method of claim 21, wherein the video sequence comprises an MPEG-2 video sequence.

23. The method of claim 14, wherein the digital array comprises the luminance components of a picture.

24. The method of claim 23, wherein the predetermined number of columns 16.

25. The method of claim 14, wherein the digital array comprises the chrominance components of a picture.

26. A method of mapping of a digital array of data into a memory subdivided into words having a predetermined number of bytes, comprising:

storing pixels of Cr chrominance components in a first number of bytes of each word;

storing pixels of Cb chrominance components in a second number of bytes of each word; and storing pixels of luminance components in a third number of bytes of each word.

27. The method of claim 26, wherein the first number and second number of bytes is equal to the number of bytes in one word.

28. The method of claim 26, wherein the sum of the first, second, and third number of bytes is equal to the number of bytes in one word.

29. The method of claim 26, wherein the memory comprises a DRAM.

30. The method of claim 26, wherein the digital array comprises a picture in a video sequence.

31. The method of claim 30, wherein the video sequence comprises an MPEG-2 video sequence.

32. A method of reading a digital array of data from a burst memory having words with a predetermined number of bytes whereby easy retrieval of the data for display is accomplished, wherein the digital array is partitioned into two or more tiles including a first tile and last tile, each tile having X rows and Y columns including a first and last row and a first and last column, comprising the steps of:

(a) reading data in a word having a word address, the word storing data of one row of one of the tiles;

(b) reading data in a word having a word address equal to the word address read in step (a) plus X; and (c) repeating step (b) each time incrementing the word address by X until all of the data in one row of the digital array is read.

33. The method of claim 32, further comprising the steps of:

(d) reading data in a word having a word address equal to the word address read in step (a) plus 1;

(e) reading data in a word having a word address equal to the word address read in step (d) plus X; and (f) repeating step (e) each time incrementing the word address by X until all of the data in one row of the digital array is read; and (g) repeating step (d), (e), and (f) each time incrementing the word address in step (d) by 1 until all of the data in the digital array is read.

34. The method of claim 32, wherein the tile in step (a) is the first tile of the digital array.

35. The method of claim 32, further comprising the step of sending the data read to the display.

36. The method of claim 32, wherein a first number of bytes of each word contain pixels of Cr chrominance components and a second number of bytes of each word contain pixels of Cb chrominance components, such that the first number and second number of bytes is equal to the number of bytes in one word.

37. The method of claim 32, the number of bytes in one row of one tile being equal to the number of bytes in one word.

38. The method of claim 32, wherein the memory comprises a DRAM.

39. The method of claim 32, wherein the digital array comprises a picture in a video sequence.

40. The method of claim 39, wherein the video sequence comprises an MPEG-2 video sequence.

41. The method of claim 32, wherein the digital array comprises the luminance components of a picture.

42. The method of claim 41, wherein the Y number of columns is 16.

43. The method of claim 32, wherein the digital array comprises the chrominance components of a picture.

44. The method of claim 43, wherein the Y number of columns is 8.

45. The method of claim 32, wherein the X number of rows is 64.

46. A method of reading an array portion of a digital array of data from a burst memory having words with a predetermined number of bytes, the array portion of the digital array having a fixed number of rows and columns, the digital array partitioned into two or more tiles each having a predetermined number of rows and columns including a first and last row and a first and last column, each row of each tile having a number of bytes, comprising the steps of:

determining the word address of the word storing the first row and the first column in the memory, for locating a first byte of data of the array portion;

determining the number of tiles that have data in the array portion;

reading the words storing a part of each tile that has data in the array portion;

selecting the columns in each tile corresponding to the columns in the array portion of the digital array.

47. The method of claim 46, wherein a first number of bytes of each word contain pixels of Cr chrominance components and a second number of bytes of each word contain pixels of Cb chrominance components, such that the first number and second number of bytes is equal to the number of bytes in one word.

48. The method of claim 46, wherein the number of bytes in one row of one tile being equal to the number of bytes in one word.

49. The method of claim 46, wherein the step of determining the number of tiles having data in the array portion of the digital array occurs concurrently with the step of reading a array portion of each tile.

50. The method of claim 46, further comprising the step of storing the selected columns in each tile in a memory buffer.

51. The method of claim 46, wherein the step of selecting the columns in each tile corresponding to the columns in the array portion of the digital array comprises:

rotating each word corresponding to a tile having the first column such that the columns corresponding to the columns in the array portion of the digital array are in the least significant bytes of each word.

52. The method of claim 46, wherein the step of selecting the columns in each tile corresponding to the columns in the array portion of the digital array comprises:

rotating each word corresponding to a tile having the last column such that the columns corresponding to the columns in the array portion of the digital array are in the most significant bytes of each word.

53. The method of claim 46, wherein the array portion of the digital array comprises a macroblock.

54. The method of claim 46, wherein the array portion of the digital array comprises a block.

55. The method of claim 46, wherein the memory comprises a DRAM.

56. The method of claim 46, wherein the digital array comprises a picture in a video sequence.

57. The method of claim 56, wherein the video sequence comprises an MPEG-2 video sequence.

58. The method of claim 46, wherein the digital array comprises the luminance components of a picture.

59. The method of claim 58, wherein the predetermined number of columns is 16.

60. The method of claim 46, wherein the digital array comprises the chrominance components of a picture.

61. The method of claim 60, wherein the predetermined number of columns is 8.

62. The method of claim 46, wherein the predetermined number of rows is 64.

63. A memory for storing a digital array of data having rows and columns partitioned into two or more tiles each having a predetermined number of rows and a predetermined number of columns, comprising:

a plurality of words, including a first word, each having a predetermined number of bytes such that a number of bytes in one row of one tile being equal to the number of bytes in one word for storing the data in one row of a tile in one word;

the data in the first row of one of the tiles is in a first word;

the data in each subsequent row of the tile is in a word having a word address adjacent and subsequent to the word storing the data of the directly preceding row, hereby easy retrieval of the subsequent row is accomplished upon the retrieval of the preceding row;

a plurality of memory rows, each row having one or more of the plurality of words; and a plurality of memory columns.

64. The memory of claim 63, wherein a first number of bytes of each word contain pixels of Cr chrominance components and a second number of bytes of each word contain pixels of Cb chrominance components, such that the first number and second number of bytes is equal to the number of bytes in one word.

65. The memory of claim 63, wherein each data in a first row of a tile of a stripe is in a word having a word address adjacent to and subsequent to the word address of a last word of an adjacent tile in a directly preceding stripe; whereby easy retrieval of the words in the tile is accomplished upon the retrieval of the words in the adjacent tile in the directly preceding stripe.

66. The memory of claim 63, wherein the number of bytes in one row of one stripe being equal to the number of bytes in one word for storing the data in one row of a stripe in one word.

67. The memory of claim 63, wherein the memory comprises a burst member.

68. The memory of claim 63, wherein the memory comprises a DRAM.

69. The memory of claim 63, wherein the digital array comprises a picture in a video sequence.

70. The memory of claim 69, wherein the video sequence comprises an MPEG-2 video sequence.

71. The memory of claim 63, wherein the digital array comprises the luminance components of a picture.

72. The memory of claim 71, wherein the predetermined number of columns is 16.

73. The memory of claim 63, wherein the digital array comprises the chrominance components of a picture.

74. The memory of claim 73, wherein the predetermined number of columns is 8.

75. The memory of claim 63, wherein the predetermined number of rows is 64.

76. A computer comprising:

an input device;

an output device;

a memory for storing a digital array of data having rows and columns partitioned into two or more tiles each having a predetermined number of rows and a predetermined number of columns, including:
- a plurality of words, including a first word, each having a predetermined number of bytes such that a number of bytes in one row of one tile being equal to the number of bytes in one word for storing the data in one row of a tile in one word;
- the data in the first row of one of the tiles is in a first word;
- the data in each subsequent row of the tile is in a word having a word address adjacent and subsequent to the word storing the data of the directly preceding row, whereby easy retrieval of the subsequent row is accomplished upon the retrieval of the preceding row;
- a plurality of memory rows, each row having one or more of the plurality of words; and
- a plurality of memory columns.

77. The computer of claim 76, wherein a first number of bytes of each word contain pixels of Cr chrominance components and a second number of bytes of each word contain pixels of Cb chrominance components, such that the first number and second number of bytes is equal to the number of bytes in one word.

78. The computer of claim 76, wherein each data in a first row of a tile of a stripe is in a word having a word address adjacent to and subsequent to the word address of a last word of an adjacent tile in a directly preceding stripe; whereby easy retrieval of the words in the tile is accomplished upon the retrieval of the words in the adjacent tile in the directly preceding stripe.

79. The computer of claim 76, wherein the number of bytes in one row of one stripe being equal to the number of bytes in one word for storing the data in one row of a stripe in one word.

80. The computer of claim 76, wherein the memory comprises a burst memory.

81. The computer of claim 76, wherein the memory comprises a DRAM.

82. The computer of claim 76, wherein the digital array comprises a picture in a video sequence.

83. The computer of claim 82, wherein the video sequence comprises an MPEG-2 video sequence.

84. The computer of claim 76, wherein the digital array comprises the luminance components of a picture.

85. The computer of claim 84, wherein the predetermined number of columns is 16.

86. The computer of claim 76, wherein the digital array comprises the chrominance components of a picture.

87. The computer of claim 86, wherein the predetermined number of columns is 8.

88. The computer of claim 76, wherein the predetermined number of rows is 64.

* * * * *